D. POWELL.
GATE.
APPLICATION FILED DEC. 10, 1914.
1,144,564.
Patented June 29, 1915.
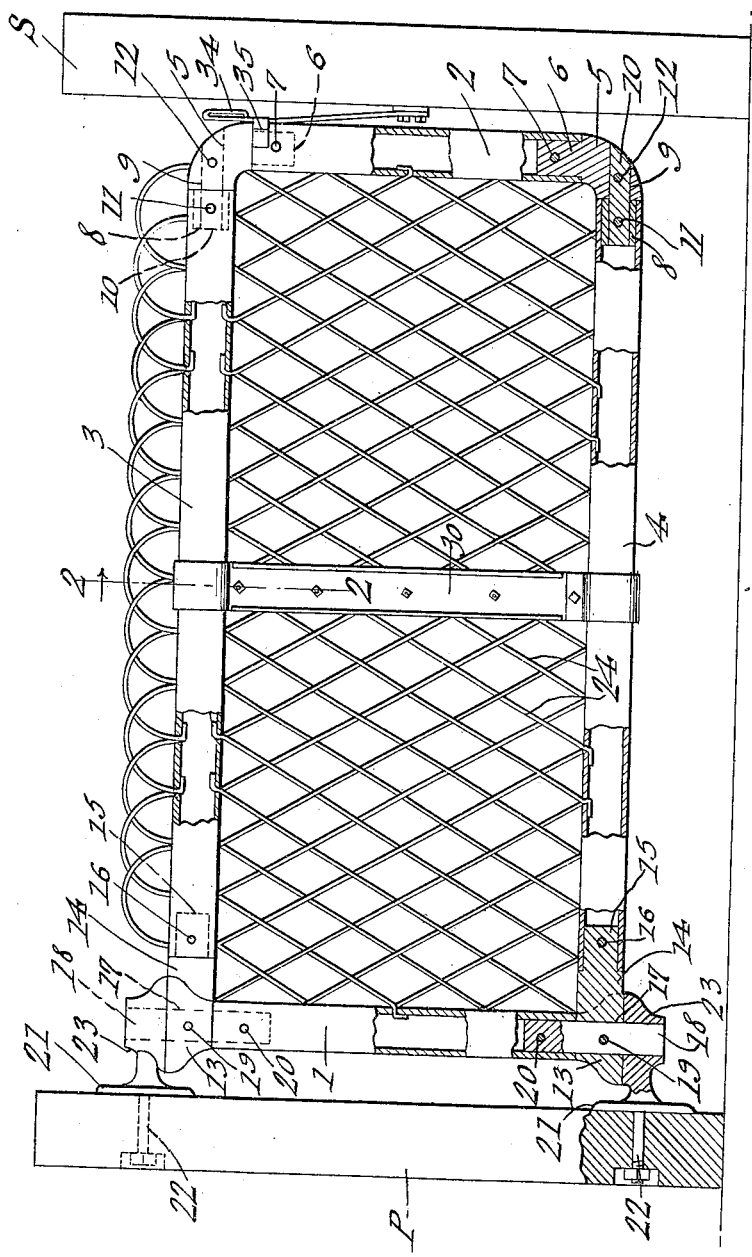
Witnesses
D. Powell
Inventor
by
Attorneys

UNITED STATES PATENT OFFICE.

DAVID POWELL, OF MURRAY, UTAH.

GATE.

1,144,564. Specification of Letters Patent. Patented June 29, 1915.

Application filed December 10, 1914. Serial No. 876,545.

*To all whom it may concern:*

Be it known that I, DAVID POWELL, a citizen of the United States, residing at Murray, in the county of Salt Lake and State of Utah, have invented a new and useful Gate, of which the following is a specification.

The present invention appertains to gates, and aims to provide a novel and improved gate construction.

It is the object of this invention to provide a gate comprising a unique assemblage of the component parts, whereby the gate will be thoroughly substantial and efficient in construction, as well as being ornamental in appearance.

A specific object is to provide novel means for assembling the ends or stiles and the rails or longitudinal members of the frame.

It is also within the scope of the invention, to provide a gate of comparatively simple, rigid and inexpensive construction, and which will be practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in its preferred embodiment in the accompanying drawing, wherein the figure is an elevation of the improved gate, portions being broken away.

The frame of the gate comprises tubular upright ends or stiles 1 and 2, and tubular upper and lower rails 3 and 4, respectively, the said parts or members of the frame being preferably constructed of piping or other suitable stock.

As a means for fastening the adjacent ends of the end member or stile 2 and the rails 3 and 4, elbows 5 are disposed between the adjacent ends of the said frame members, and are provided with reduced stubs or shanks 6 projecting and fitting snugly within the end portions of the stile 2, and rivets or other securing elements 7 are engaged through the stile 2 and shanks 6 to secure the elbows 5 to the said stile. Tubular members or sleeves 8 are fitted snugly within the adjacent ends of the rails 3 and 4, and the elbows 5 are provided with bores or openings 9 alining and registering with the bores of the sleeves 8, and rods or pins 10 are inserted into the bores 9 and sleeves 8. Rivets or other securing elements 11 are engaged through the end portions of the rails 3 and 4, the sleeves 8 and pins 10, and rivets or other securing elements 12 are engaged through the elbows 5 and pins 10. Thus, the stiles 2, rails 3 and 4, and the elbows 5 are securely fastened together.

In order to secure the stile 1 and rails together, and to pivotally mount or hinge the gate to the post P, corner members 13 are seated against the ends of the said stile 1, and are provided with radial extensions 14 abutting against the ends of the rails 3 and 4, and provided with reduced stubs or shanks 15 projecting into and fitting snugly within the adjacent ends of the rails. Rivets or other securing elements 16 are engaged through the corresponding ends of the rails and the shanks 15, to fasten the corner members 13 to the rails. The corner members 13 are provided with upright or vertical bores 17 through which hinge pins 18 are engaged so as to project into and fit within the ends of the stile 1, rivets 19 and 20 being engaged through the corner members 13 and pins 18, and through the end portions of the stile 1 and pins 18 to secure the said parts together. The lower and upper pins 18 project or protrude beyond the respective lower and upper corner members 13 to enable the gate to be pivoted or hinged to the post or hangers carried thereby.

The hangers carried by the post P embody plates 21 resting against the post, and bolts 22 engaged through the post to secure the hangers in place, the plates 21 having heads 23 through which the protruding ends of the pivot pins 18 are journaled. The lower corner member 13 seats upon the lower head 23 and the upper member 13 fits snugly against the bottom of the upper head 23, the corner members 13 having relatively large flat contacting bearing surfaces to support the gate in a substantial manner.

Oblique crossed and intermeshed filler wires 24 are disposed within the frame of the gate, and have their ends secured to the frame members or tubes 1, 2, 3 and 4.

An upright brace or stay 30, formed preferably from a channel iron, is disposed between the rails intermediate the stiles 1 and 2, and has its ends secured to the rails.

The free end of the gate may be held adjacent the striking post S, when the gate is closed, by means of an upwardly projecting leaf spring or latch 34 secured to the post S and carrying a bar or member 35 bent to receive the free end of the gate and to snap into engagement with the same under the influence of the spring 34.

In assembling the parts of the present gate, the filler wires 24 are preferably applied to the tubes or members 1, 2, 3 and 4 of the frame, before the corner members 5 and 13 are applied to the frame tubes or members. The corner members 5 and 13 then may be readily applied to the adjacent ends of the frame members or tubes, without the necessity of displacing or shifting the tubes or members of the frame, since the pins 10 and 18 may be readily inserted into place through the corner members and into the respective tubes of the frame, and finally, the rivets or securing elements may be engaged through the respective parts.

What is claimed is:—

1. A gate frame comprising tubes, corner members disposed between the adjacent ends of the tubes and each having a portion fitting snugly and secured within the end of one adjacent tube, and a pin engaged through each of the corner members and fitting snugly and secured within the end of the other adjacent tube.

2. A gate comprising a frame embodying upper and lower tubular rails, a tubular stile, corner members between the said stile and rails, the corner members having portions fitting and secured within the ends of the rails and abutting against the ends of the stile, and pins engaged through the said corner members, the pins fitting snugly and secured within the said corner members and the end portions of the stile, and said pins projecting from the said corner members to provide means for hinging the gate.

In testimony that I claim the foregoing as my own, I have hereto affixed my signature in the presence of two witnesses.

DAVID POWELL.

Witnesses:
FRED PETERS,
W. J. WARENSKI.